United States Patent
Shih et al.

(10) Patent No.: US 7,691,257 B2
(45) Date of Patent: Apr. 6, 2010

(54) PROCESS TO MANUFACTURE LOW SULFUR DIESEL FUELS

(75) Inventors: Stuart S. Shih, Gainesville, VA (US);
Stuart L. Soled, Pittstown, NJ (US);
Sabato Miseo, Pittstown, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 943 days.

(21) Appl. No.: 11/096,503

(22) Filed: Apr. 1, 2005

(65) Prior Publication Data

US 2005/0247602 A1     Nov. 10, 2005

Related U.S. Application Data

(60) Provisional application No. 60/564,405, filed on Apr. 22, 2004.

(51) Int. Cl.
*C10G 45/04* (2006.01)

(52) U.S. Cl. .......... 208/216 R; 208/15; 208/16; 208/112; 208/208 R; 208/210; 208/213; 208/215; 208/217; 208/249; 208/305; 502/305; 502/313

(58) Field of Classification Search .......... 208/15, 208/16, 208 R, 213, 215, 216 R, 217, 249, 208/299, 305, 112, 210; 502/305, 313
See application file for complete search history.

(56) References Cited

U.S. PATENT DOCUMENTS

| | | | | |
|---|---|---|---|---|
| 5,114,562 | A * | 5/1992 | Haun et al. | 208/89 |
| 5,348,928 | A * | 9/1994 | Kukes et al. | 502/306 |
| 6,071,402 | A * | 6/2000 | Danot et al. | 208/112 |
| 6,534,437 | B2 * | 3/2003 | Eijsbouts et al. | 502/313 |
| 2004/0040887 | A1 * | 3/2004 | Simon et al. | 208/16 |

\* cited by examiner

*Primary Examiner*—In Suk Bullock
*Assistant Examiner*—Prem C. Singh

(57) ABSTRACT

A process is provided for producing low sulfur diesel by hydrotreatment of suitable feed in the presence of a bulk metal catalyst. The feed is exposed under effective hydrotreating conditions to a catalyst including at least one Group VI metal, at least one Group VIII metal, and Niobium. Treatment of the feed results in production of a liquid diesel product, which is separated from a gas phase product that is also produced during the hydrotreatment.

27 Claims, 3 Drawing Sheets

PROCESS TO MANUFACTURE LOW SULFUR DIESEL FUELS

CROSS-REFERENCE TO RELATED APPLICATION

This application claims benefit of U.S. Provisional Patent Application Ser. No. 60/564,405 filed Apr. 22, 2004.

FIELD OF THE INVENTION

The instant invention relates to a process for upgrading hydrocarbon feedstreams boiling within the diesel range. More particularly, the instant invention relates to a process to produce low sulfur diesel products through the hydrotreating of diesel boiling range feedstreams in the presence of a bulk metal hydrotreating catalyst comprising Nb, at least one metal selected from Group VIB metals, and at least one metal selected from Group VIII metals.

BACKGROUND OF THE INVENTION

Environmental and regulatory initiatives are requiring ever lower levels of both sulfur and aromatics in distillate fuels. For example, proposed sulfur limits for distillate fuels to be marketed in the European Union for the year 2005 is 50 wppm or less. There are also proposed limits that would require lower levels of total aromatics as well as lower levels of multi-ring aromatics found in distillate fuels and heavier hydrocarbon products. Further, the maximum allowable total aromatics level for CARB reference diesel and Swedish Class I diesel are 10 and 5 vol. %, respectively. Further, the CARB reference fuels allow no more than 1.4 vol. % polyaromatics (PNAs). Consequently, much work is presently being done in the hydrotreating art because of these proposed regulations.

However, as the supply of low sulfur, low nitrogen crudes decreases, refineries are processing crudes with greater sulfur and nitrogen contents at the same time that environmental regulations are mandating lower levels of these heteroatoms in products. Consequently, a need exists for increasingly efficient diesel desulfurization and denitrogenation processes. Therefore, processes and catalysts have been developed to reduce the concentration of sulfur and nitrogen contaminants in these streams.

In one approach, a family of compounds, related to hydrotalcites, e.g., ammonium nickel molybdates, has been prepared as catalysts to be used in such processes. Whereas X-ray diffraction analysis has shown that hydrotalcites are composed of layered phases with positively charged sheets and exchangeable anions located in the galleries between the sheets, the related ammonium nickel molybdate phase has molybdate anions in interlayer galleries bonded to nickel oxyhydroxide sheets. See, for example, Levin, D., Soled, S. L., and Ying, J. Y., Crystal Structure of an Ammonium Nickel Molybdate prepared by *Chemical Precipitation, Inorganic Chemistry*, Vol. 35, No. 14, p. 4191-4197 (1996). The preparation of such materials also has been reported by Teichner and Astier, *Appl. Catal.* 72, 321-29 (1991); *Ann. Chim. Fr.* 12, 337-43 (1987), and *C. R. Acad. Sci.* 304 (II), #11, 563-6 (1987) and Mazzocchia, *Solid State Ionics,* 63-65 (1993) 731-35.

Also, processes to produce fuels to meet the ever more restrictive Environmental regulations, such as hydrotreating, are well known in the art and typically requires treating the petroleum streams with hydrogen in the presence of a supported catalyst at hydrotreating conditions. The catalyst is usually comprised of a Group VI metal with one or more Group VIII metals as promoters on a refractory support. Hydrotreating catalysts that are particularly suitable for hydrodesulfurization, as well as hydrodenitrogenation, generally contain molybdenum or tungsten on alumina promoted with a metal such as cobalt, nickel, iron, or a combination thereof. Cobalt promoted molybdenum on alumina catalysts are most widely used when the limiting specifications are hydrodesulfurization, while nickel promoted molybdenum on alumina catalysts are the most widely used for hydrodenitrogenation, partial aromatic saturation, as well as hydrodesulfurization.

However, there still exists a need in the art for a process to reduce the sulfur and nitrogen content in diesel boiling range hydrocarbon streams.

SUMMARY OF THE INVENTION

The instant invention is directed at a process for producing low sulfur diesel products. The process comprises:

a) contacting a diesel boiling range feedstream containing aromatics, nitrogen and organically bound sulfur contaminants in a reaction stage with a bulk metal hydrotreating catalyst comprising Nb, at least one metal selected from Group VIB metals and at least one metal selected from Group VIII metals in the presence of hydrogen-containing treat gas thereby producing a reaction product comprising at least a vapor product and a liquid diesel boiling range product, wherein said diesel boiling range feedstream is contacted with said catalyst under effective hydrotreating conditions.

In one embodiment of the instant invention, said process further comprises:

b) separating said vapor product from said liquid diesel boiling range product; and c) recovering said liquid diesel boiling range boiling range product.

In one embodiment of the instant invention, said effective hydrotreating conditions are conditions effective at removing at least a portion of said nitrogen and organically bound sulfur contaminants and hydrogenating at least a portion of said aromatics, thus producing at least a liquid diesel boiling range product having a lower concentration of aromatics and nitrogen and organically bound sulfur contaminants than the diesel boiling range feedstream.

DETAILED DESCRIPTION OF THE INSTANT INVENTION

Figure 1:
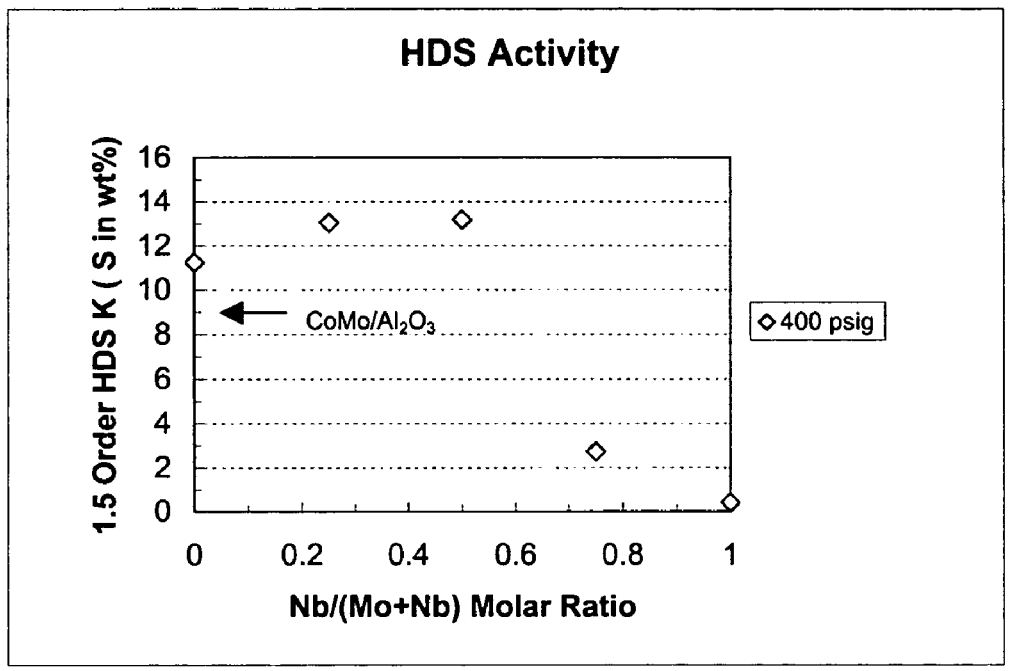
FIG. 1 compares the hydrodesulfurization activity of various CoMoNb bulk hydrotreating catalysts to the hydrodesulfurization activity of a commercial hydrotreating catalyst.

It should be noted that the terms "bulk" and "unsupported" when used in conjunction with the hydrotreating catalysts disclosed herein are synonymous and are sometimes used interchangeably.

The present invention involves contacting a diesel boiling range feedstream containing organically bound sulfur contaminants in a reaction stage with a bulk metal hydrotreating catalyst comprising Nb, at least one metal selected from Group VIB metals, and at least one metal selected from Group VIII metals. The contacting of the diesel boiling range feedstream and the hydrotreating catalyst occurs in the presence of a hydrogen-containing treat gas. The reaction stage is operated under conditions effective at removing at least a portion of the organically bound sulfur contaminants. The contacting of the diesel boiling range feedstream with the hydrotreating catalyst produces a liquid diesel boiling range product having a lower concentration of organically bound sulfur contaminants than the diesel boiling range feedstream.

Feedstreams suitable for treatment with the present method boil within the diesel range. The diesel boiling range includes streams boiling in the range of about 300° F. to about 775° F., preferably about 350° F. to about 750° F., more preferably about 400° F. to about 700° F., most preferably about 450° F. to about 650° F. These include diesel boiling range feedstreams that are not hydrotreated, are a blend of non-hydrotreated diesel boiling range feedstreams, previously hydrotreated diesel boiling range feedstreams, blends of hydrotreated diesel boiling range feedstreams, and blends of non-hydrotreated and hydrotreated diesel boiling range feedstreams.

The diesel boiling range feedstreams suitable for treatment with the present method also contain nitrogen. Typically, the nitrogen content of such streams is about 50 to about 1000 wppm nitrogen, preferably about 75 to about 800 wppm nitrogen, and more preferably about 100 to about 700 wppm nitrogen. The nitrogen appears as both basic and non-basic nitrogen species. Non-limiting examples of basic nitrogen species may include quinolines and substituted quinolines, and non-limiting examples of non-basic nitrogen species may include carbazoles and substituted carbazoles. The sulfur content of the diesel boiling range feedstream will generally range from about 50 wppm to about 7000 wppm, more typically from about 100 wppm to about 5000 wppm, and most typically from about 100 to about 3000 wppm. The sulfur will usually be present as organically bound sulfur. That is, as sulfur compounds such as simple aliphatic, naphthenic, and aromatic mercaptans, sulfides, di- and polysulfides and the like. Other organically bound sulfur compounds include the class of heterocyclic sulfur compounds such as thiophene, tetrahydrothiophene, benzothiophene and their higher homologs and analogs. Aromatics are typically present in an amount ranging from about 0.05 wt. %, to about 2.5 wt. %, based on the diesel boiling range feedstream.

Hydrogen-containing treat gasses suitable for use in the presently disclosed process can be comprised of substantially pure hydrogen or can be mixtures of other components typically found in refinery hydrogen streams. It is preferred that the hydrogen-containing treat gas stream contains little, more preferably no, hydrogen sulfide. The hydrogen-containing treat gas purity should be at least about 50% by volume hydrogen, preferably at least about 75% by volume hydrogen, and more preferably at least about 90% by volume hydrogen for best results. It is most preferred that the hydrogen-containing stream be substantially pure hydrogen.

In the reaction stage, the above-described diesel boiling range feedstream is contacted with a bulk metal hydrotreating catalyst comprising Nb, at least one metal selected from Group VIB metals, and at least one metal selected from Group VIII metals. By bulk metal, it is meant that the catalysts used in the present invention are unsupported. The bulk metal hydrotreating catalyst can comprise from about 0 to about 50 wt. % Nb, based on the catalyst, preferably about 2 to about 45 wt. %, more preferably about 10 to about 35 wt. %, and most preferably about 15 to about 20 wt. %. The at least one Group VIB metal can be present in amounts ranging from about 0 to about 60 wt. %, based on the catalyst, preferably about 1 to about 50 wt. %, more preferably about 10 to about 40 wt. %, and most preferably about 15 to about 30 wt. %. The at least one Group VIII metal can be present in amounts, ranging from about 0 to about 50 wt. %, based on the catalyst, preferably about 10 to about 45 wt. %, more preferably about 20 to about 40 wt. %, and most preferably about 30 to about 40 wt. %. Preferred Group VIB metals include Mo and W while the most preferred Group VIB metal is Mo. Preferred Group VIII metals include Co, Ni, Rh, Pt, Pd, Ir, and mixtures thereof, while the most preferred Group VIII metal is selected from Co, Ni, and mixtures thereof. Particularly preferred bulk metal hydrotreating catalyst compositions for use herein are CoMoNb bulk metal catalysts having the concentration of each metal as outlined above, and CoNiMoNb also having concentrations of metals defined above. The inventors hereof have unexpectedly discovered that these bulk metal hydrotreating catalysts, when used in hydrotreating diesel boiling range feedstreams, are more active for desulfurization, denitrogenation, and hydrogenation than conventional hydrotreating catalysts.

It is also useful to describe the bulk metal hydrotreating catalysts used herein as having specific molar concentrations of each metal. Therefore, in one embodiment the finished catalysts used herein have the metals concentrations described above and are also described as those bulk metal hydrotreating catalysts in the oxide state having a composition of Group $VIB_x$Group $VIII_yNb_z$, excluding the oxygen, wherein x, y, and z describe relative molar quantities. Thus, the bulk metal hydrotreating catalysts used herein comprise about 0.1 to about 2.0 moles Nb, denoted by "z", preferably 0.2 to about 1.5 moles, more preferably about 0.2 to about 0.8 moles. The at least one Group VIB metal, denoted by "x", is present in amounts ranging from about 0.1 to about 2 moles, preferably about 0.2 to about 1.5 moles, more preferably about 0.2 to about 0.8 moles. The at least one Group VIII metal, denoted by "y", is present in amounts ranging from about 0.5 to about 2 moles, preferably about 0.8 to about 1.5 moles, more preferably about 1 to about 1.5 moles. Preferred Group VIB metals include Mo and W while the most preferred Group VIB metal is Mo. Preferred Group VIII metals include Co, Ni, Rh, Pt, Pd, and Ir, while the most preferred Group VIII metal is at least one of Co, Ni, and mixtures thereof. Thus, particularly preferred catalyst compositions for use herein comprise CoMoNb and CoNiMoNb bulk metal hydrotreating catalysts having the concentration of each metal as outlined above.

The bulk metal hydrotreating catalysts herein can be prepared by any methods known in the catalyst art for forming bulk metal catalysts. Non-limiting examples of these methods include those outlined in Teichner and Astier, *Appl. Catal.* 72, 321-29 (1991); *Ann. Chim. Fr.* 12, 337-43 (1987), and *C. R. Acad. Sci.* 304 (II), #11, 563-6 (1987) and Mazzocchia, *Solid State Ionics,* 63-65 (1993) 731-35, which are hereby incorporated by reference. The bulk metal hydrotreating catalysts used herein are preferably made by reacting insoluble or partially insoluble metal salts of the metals in the presence of a protic liquid. Preferably, at least one of the metal components remains at least partly in the solid state during the entire catalyst making process. It is also preferred that the at least one Group VIII and at least one Group VIB metals comprise from about 50 wt. % to about 100 wt. %, calculated as oxides, of the total weight of the bulk catalyst particles. The preferred methods of making the catalyst compositions used herein are described in more detail in U.S. Pat. Nos. 6,156,695, 6,534,437, 6,162,350, 6,299,760, and PCT published application WO00/41810, which are incorporated herein by reference for all purposes to the extent that they are not inconsistent with the present invention disclosure and claims. The bulk metal hydrotreating catalyst is preferably sulfided prior to use, and most preferably made by the methods outlined in U.S. Pat. Nos. 6,534,437 and 6,162,350.

The reaction stage can be comprised of one or more reactors or reaction zones each of which can comprise one or more catalyst beds of the same or different bulk metal hydrotreating catalyst described above. Although other types of catalyst beds can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed since some olefin saturation can take place, and olefin saturation and the hydrotreating reaction are generally exothermic. A portion of the heat generated during hydrotreating can be recovered. Where this heat recovery option is not available, conventional cooling may be performed through cooling utilities such as cooling water or air, or through use of a hydrogen quench stream. In this manner, optimum reaction temperatures can be more easily maintained.

As previously stated, the diesel boiling range feedstream is contacted with the above-defined catalyst in a reaction stage under effective hydrotreating conditions. These conditions typically include temperatures ranging from about 150° C. to about 425° C., preferably about 200° C. to about 370° C., more preferably about 230° C. to about 350° C. Typical weight hourly space velocities ("WHSV") range from about 0.1 to about 20 hr$^{-1}$, preferably from about 0.5 to about 5 hr$^{-1}$. Any effective pressure can be utilized, and pressures typically range from about 4 to about 70 atmospheres, preferably 10 to 40 atmospheres.

The contacting of the diesel boiling range feedstream with the above-described hydrotreating catalysts produces a reaction product comprising at least a vapor product and a liquid diesel boiling range product. The vapor product typically comprises gaseous reaction products such as $H_2S$, and the liquid reaction product typically comprises a liquid diesel boiling range product having a reduced level of nitrogen, aromatics, and sulfur contaminants. Thus, in one embodiment of the present invention, the vapor product and the liquid diesel boiling range product are separated, and the liquid diesel boiling range product recovered. The method of separating the vapor product from the liquid diesel boiling range product is not critical to the instant invention and can be accomplished by any means known to be effective at separating gaseous and liquid reaction products. For example, a stripping tower or reaction zone can be used to separate the vapor product from the liquid diesel boiling range product. The diesel boiling range product thus recovered will have a sulfur concentration lower than that of the diesel boiling range feedstream, and will preferably have a sulfur level low enough to meet regulatory requirements imposed at the time or production.

The above description is directed to several embodiments of the present invention. Those skilled in the art will recognize that other embodiments that are equally effective could be devised for carrying out the spirit of this invention.

The following examples will illustrate the improved effectiveness of the present invention, but are not meant to limit the present invention in any fashion.

EXAMPLES

Example 1

The unexpected results achieved by utilizing a Nb-containing catalyst as described above was illustrated by comparing the hydrotreating activity of CoMoNb catalysts to a commercial supported hydrotreating catalyst. The commercial hydrotreating catalyst was obtained from Akzo Nobel and is marketed as KF-757. The weight percent and molar ratio of each element of the bulk metal hydrotreating catalysts used in this experiment are contained in Table 1 below. It should be noted that the molar ratios contained in Table 1 exclude oxygen.

TABLE 1

CoMoNb Bulk Hydrotreating Catalyst Compositions

| Catalyst | Co (molar ratio) x | Mo (molar ratio) y | Nb (molar ratio) z | Co (wt. %) | Mo (wt. %) | Nb (wt. %) |
| --- | --- | --- | --- | --- | --- | --- |
| CoMo | 1.50 | 1.00 |  | 34.50 | 37.40 | 0.00 |
| CoMoNb | 1.50 | 0.75 | 0.25 | 34.90 | 28.40 | 9.20 |
| CoMoNb | 1.50 | 0.50 | 0.50 | 35.20 | 19.10 | 18.50 |
| CoMoNb | 1.50 | 0.75 | 0.25 | 35.60 | 9.70 | 28.10 |
| CoNb | 1.50 |  | 1.00 | 36.00 | 0.00 | 37.90 |

Each of the catalysts described in Table 1, along with the commercial hydrotreating catalyst, was evaluated for hydrodesulfurization ("HDS") activity, hydrodenitrogenation ("HDN") activity, and hydrogenation activity. A total of 6 cc of each of the catalysts was placed in a fixed bed downflow reactor and contacted with a diesel boiling range distillate having 1.6 wt. % sulfur, an API Gravity of 32.3, 100 wppm nitrogen, and an initial and final boiling point of 396° F. and 779° F., respectively. The diesel boiling range distillate and the catalysts were contacted under hydrotreating conditions including temperatures of 625° F., hydrogen treat rates of 2000 scf/bbl substantially pure hydrogen, pressures of 400 psig, and liquid hourly space velocities ("LHSV") of 1.0 hr$^{-1}$.

The HDS activity, expressed as a 1.5 order rate constant kHDS, of each of the CoMoNb catalysts was then calculated by an apparent 1.5 order reaction respected to sulfur concentration and compared to the HDS activity of the conventional catalyst. The $k_{HDS}$ equation used was $k_{HDS}=[(1/C_p^{0.5})-(1/C_f^{0.5})]\times LHSV/0.5$. Where $C_f$ and $C_p$ are sulfur concentrations expressed as wt. % for feed and product, respectively. The results are contained in FIG. 1.

As can be seen in FIG. 1, the $Co_{1.5}Mo_{1.0}$, $Co_{1.5}Mo_{0.74}Nb_{0.25}$, and $Co_{1.5}Mo_{0.5}Nb_{0.5}$ catalysts were more active for HDS than the commercial catalyst. FIG. 1 also demonstrates that the Nb promoted $Co_{1.5}Mo_{0.74}Nb_{0.25}$, and $Co_{1.5}Mo_{0.5}Nb_{0.5}$ catalysts were the most active for HDS.

The HDN activity, expressed as a 1.5 order rate constant kHDN, of each of the CoMoNb catalysts was then calculated by an apparent 1.5 order reaction respected to sulfur concentration and compared to the HDN activity of the conventional catalyst. The $k_{HDS}$ equation used was $k_{HDN}=LHSV\times Ln(C_f/$ $C_p$). Where $C_f$ and $C_p$ are nitrogen concentrations expressed as wppm for feed and product, respectively. The results are contained in FIG. 2.

Figure 2:
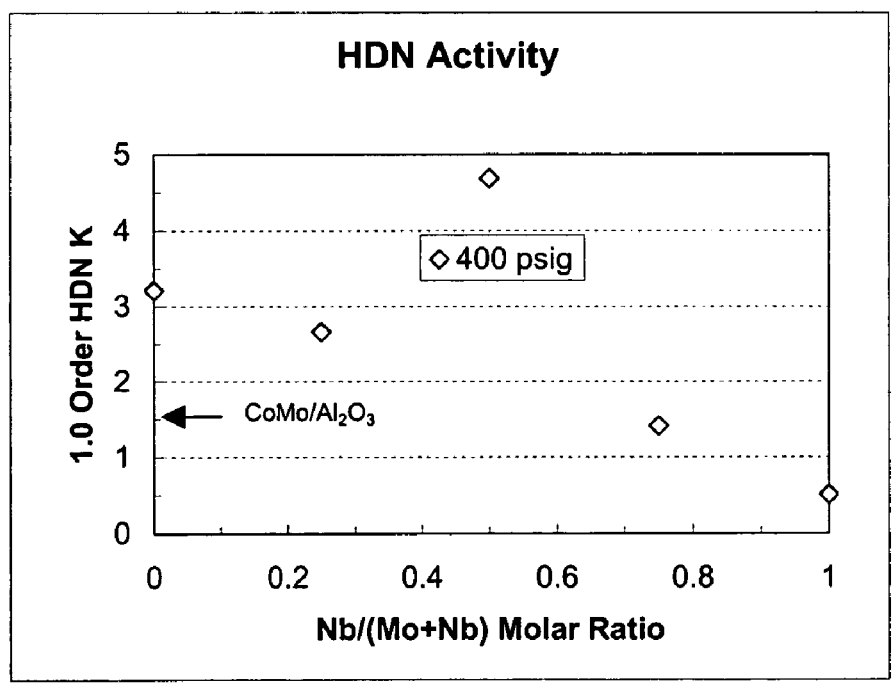
FIG. 2 compares the hydrodenitrogenation activity of various CoMoNb bulk hydrotreating catalysts to the hydrodenitrogenation activity of a commercial hydrotreating catalyst.

As can be seen in FIG. 2, the $Co_{1.5}Mo_{1.0}$, $Co_{1.5}Mo_{0.74}Nb_{0.25}$, and $Co_{1.5}Mo_{0.5}Nb_{0.5}$ catalysts were more active for HDN than the commercial catalyst. FIG. 2 also demonstrates that the Nb promoted $Co_{1.5}Mo_{0.74}Nb_{0.25}$, and $C_{0.5}Mo_{0.5}Nb_{0.5}$ catalysts were the most active for HDN.

The hydrogenation activity of each catalyst, expressed as API gravity, was then calculated and compared to the hydrogenation activity of the commercial catalyst. API gravity is a reliable method of comparing hydrogenation activity because it is known that the hydrogenation of aromatics will increase the API gravity of a hydrocarbon stream. The results are contained in FIG. 3. It should be noted that the hydrogenation activity is expressed in terms of the API density of the desulfurized product.

Figure 3:
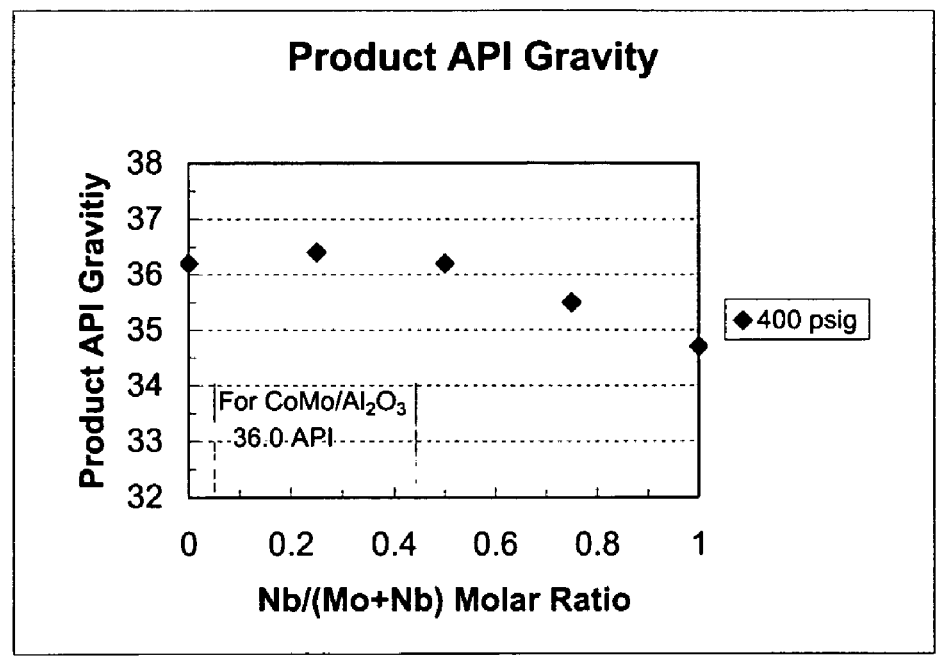
FIG. 3 compares the hydrogenation activity of various CoMoNb bulk hydrotreating catalysts to the hydrogenation activity of a commercial hydrotreating catalyst.

As can be seen in FIG. 3, the $Co_{1.5}Mo_{1.0}$, $Co_{1.5}Mo_{0.74}Nb_{0.25}$, and $Co_{1.5}Mo_{0.5}Nb_{0.5}$ catalysts were more active for hydrogenation than the commercial catalyst. FIG. 3 also demonstrates that the Nb promoted $Co_{1.5}Mo_{0.74}Nb_{0.25}$, and $Co_{1.5}Mo_{0.5}Nb_{0.5}$ catalysts were the most active for hydrogenation.

Example 2

The unexpected results achieved by utilizing a Nb-containing catalyst as described above was illustrated by comparing the hydrotreating activity of CoNiMoNb hydrotreating catalysts having a compositional formula of $Co_aNi_bMo_cNb_d$, wherein a, b, c, and d are the respective molar ratios of each component, to a commercial supported hydrotreating catalyst, also. The commercial hydrotreating catalyst was obtained from Akzo Nobel and is marketed as KF-757. The weight percent of each element of the bulk metal hydrotreating catalysts used in this experiment are contained in Table 2 below.

TABLE 2

CoNiMoNb Bulk Hydrotreating Catalyst Compositions

| Catalyst | Co (molar ratio) a | Ni (molar ratio) b | Mo (molar ratio) c | Nb (molar ratio) d | Co (wt. %) | Ni (wt. %) | Mo (wt. %) | Nb (wt. %) |
|---|---|---|---|---|---|---|---|---|
| CoNiMo | 0.75 | 0.25 | 1.00 | 0.00 | 20.60 | 6.80 | 44.79 | 0.00 |
| CoNiMoNb | 0.20 | 1.00 | 0.50 | 0.50 | 7.50 | 27.30 | 46.19 | 14.90 |

Each of the catalysts described in Table 2, along with the commercial hydrotreating catalyst, was evaluated for hydrodesulfurization ("HDS") activity, hydrodenitrogenation ("HDN") activity, and hydrogenation activity. A total of 6 cc of each of the catalysts was placed in a fixed bed downflow reactor and contacted with the same diesel boiling range distillate used in Example 1 above. The diesel boiling range distillate and the catalysts were contacted under hydrotreating conditions including temperatures of 625° F., hydrogen treat rates of 2000 scf/bbl substantially pure hydrogen, pressures of 400 psig, and liquid hourly space velocities ("LHSV") of 1.0 hr$^{-1}$.

The HDN and HDN activity of the CoNiMo catalyst was then calculated as described above, and compared to the HDS and HDN activity of the commercial catalyst. The results are contained in FIG. 4.

Figure 4:
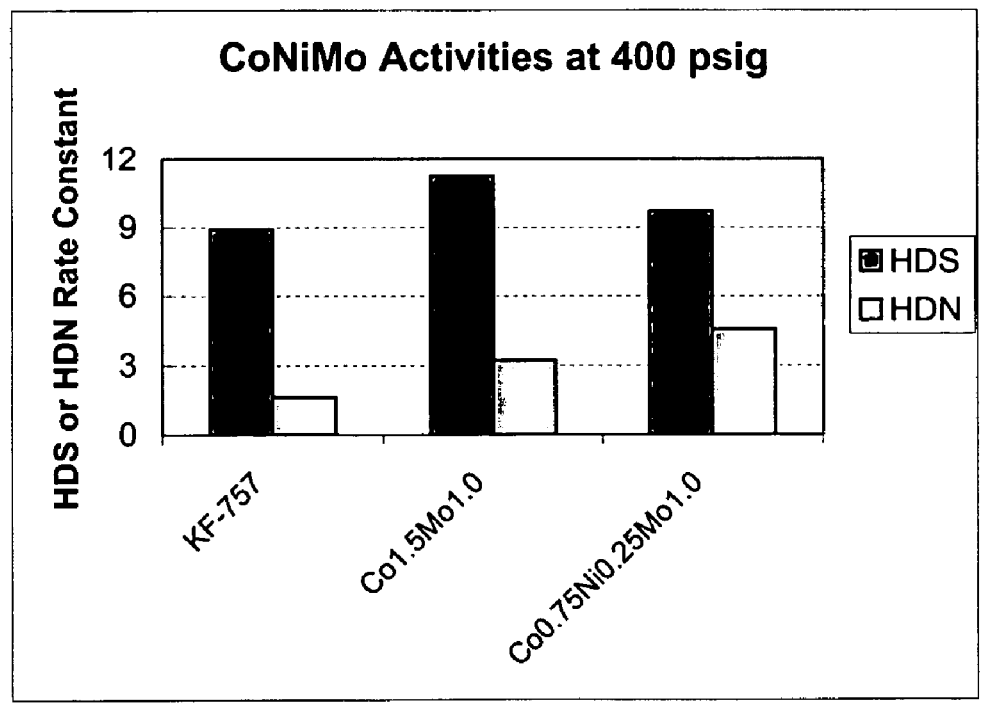
FIG. 4 compares the hydrodesulfurization and hydrodenitrogenation activity of a CoNiMo bulk hydrotreating catalyst to the hydrodesulfurization activity of a commercial hydrotreating catalyst and a CoMo bulk hydrotreating catalyst.

As can be seen in FIG. 4, compared to $Co_{1.5}M_{1.0}$, $Co_{0.75}Ni_{0.25}MO_{1.0}$ was more active for denitrogenation but less active for desulfurization (FIG. 4). However, it was more active than the commercial hydrotreating catalyst.

Figure 5:
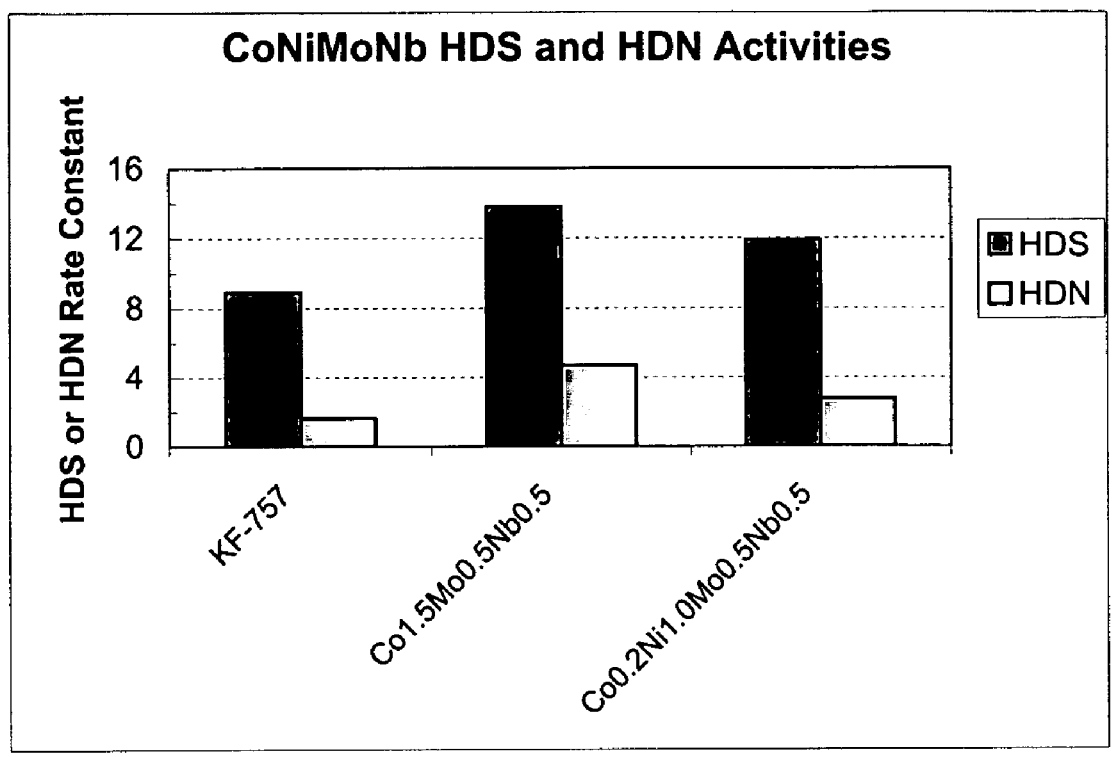
FIG. 5 compares the hydrodesulfurization and hydrodenitrogenation activity of a CoNiMoNb bulk hydrotreating catalyst to the hydrodesulfurization activity of a commercial hydrotreating catalyst and a CoMoNb bulk catalyst.

The HDN and HDN activity of the CoNiMoNb catalyst was then calculated as described above, and compared to the HDS and HDN activity of the commercial catalyst. The results are contained in FIG. 5, below. As can be seen in FIG. 5, compared to $Co_{1.5}Mo_{0.5}Nb_{0.5}$, $Co_{0.2}Ni_{1.0}Mo_{0.5}Nb_{0.5}$ was less active for both desulfurization and denitrogenation. However, it was still more active than the KF-757 commercial catalyst.

The invention claimed is:

1. A process for producing low sulfur diesel products from a diesel boiling range feedstream comprising:
   a) contacting a diesel boiling range feedstream containing aromatics, nitrogen and organically bound sulfur contaminants in a reaction stage with a bulk metal hydrotreating catalyst having metals consisting of Nb, Mo, and at least one metal selected from Group VIII metals in the presence of hydrogen-containing treat gas thereby producing a reaction product comprising at least a vapor product and a liquid diesel boiling range product, wherein said diesel boiling range feedstream is contacted with said catalyst under effective hydrotreating conditions,
   wherein said bulk metal hydrotreating catalyst comprises about 15 to about 20 wt. % Nb, about 15 to about 30 wt. % Mo, and about 30 to about 40 wt. % of said at least one Group VIII metal selected from Co, Ni, Rh, Pt, Pd, Ir, and mixtures thereof.

2. The process according to claim 1 wherein said reaction stage comprises one or more reactors or reaction zones each of which can comprise one or more catalyst beds selected from the group consisting of fluidized beds, ebullating beds, slurry beds, fixed beds, and moving beds wherein each of said one or more catalyst beds contains a catalyst suitable for the reaction zone in which the catalyst bed is located.

3. The process according to claim 2 wherein said reaction stage comprises one or more fixed catalyst beds.

4. The process according to claim 2 wherein said process further comprises cooling between catalyst beds, reactors, or reaction zones in said reaction stage.

5. The process according to claim 1 wherein said diesel boiling range feedstream boils in the range of about 300° F. to about 775° F.

6. The process according to claim 5 wherein said diesel boiling range feedstream is selected from (i) diesel boiling range feedstreams that are not hydrotreated; (ii) are a blend of non-hydrotreated diesel boiling range feedstreams; (iii) are previously hydrotreated diesel boiling range feedstreams; (iv)

are blends of hydrotreated diesel boiling range feedstreams; and (v) are blends of non-hydrotreated and hydrotreated diesel boiling range feedstreams.

7. The process according to claim 1 wherein said at least one Group VIII metal is selected from Co, Ni, and mixtures thereof.

8. The process according to claim 1 wherein said bulk metal hydrotreating catalyst is selected from CoMoNb and CoNiMoNb catalysts.

9. The process according to claim 1 wherein said process further comprises:
   b) separating said vapor product from said liquid diesel boiling range product; and
   c) recovering said liquid diesel boiling range product.

10. The process according to claim 1 wherein said effective hydrotreating conditions are selected in such a manner that at least a portion of said nitrogen and organically bound sulfur contaminants are removed from said diesel boiling range feedstream and at least a portion of said aromatics are hydrogenated.

11. The process according to claim 10 wherein said liquid diesel boiling range product has a sulfur, nitrogen, and aromatics concentration lower than said diesel boiling range feedstream.

12. The process according to claim 10 wherein said effective hydrotreating conditions comprise temperatures ranging from about 150° C. to about 425° C., weight hourly space velocities range from about 0.1 to about 20 $hr^{-1}$, and pressures ranging from about 4 to about 70 atmospheres.

13. The process according to claim 1 wherein the nitrogen content of diesel boiling range feedstream is about 50 to about 1000 wppm nitrogen, the sulfur content of the diesel boiling range feedstream ranges from about 50 wppm to about 7000 wppm, and the aromatics content ranges from about 0.05 wt. % to about 2.5 wt. %, all based on the diesel boiling range feedstream.

14. The process according to claim 1 wherein the at least one Group VIII metal and Mo comprise from about 50 wt. % to about 100 wt. %, calculated as oxides, of the total weight of the bulk metal hydrotreating catalyst.

15. A process for producing low sulfur diesel products from a diesel boiling range feedstream comprising:
   a) contacting a diesel boiling range feedstream in the range of about 300° F. to about 775° F. and containing aromatics, nitrogen and organically bound sulfur contaminants in a reaction stage with a bulk metal hydrotreating catalyst having metals consisting of Nb, Mo and at least one Group VIII metal selected from Co, Ni, Rh, Pt, Pd, Ir, and mixtures thereof in the presence of hydrogen-containing treat gas thereby producing a reaction product comprising at least a vapor product and a liquid diesel boiling range product, wherein said diesel boiling range feedstream is contacted with said catalyst under hydrotreating conditions effective at removing at least a portion of said nitrogen and organically bound sulfur contaminants and hydrogenating at least a portion of said aromatics,
   wherein said bulk metal hydrotreating catalyst comprises about 10 to about 35 wt. % Nb, about 20 to about 40 wt. % Mo, and about 20 to about 40 wt. % of said at least one Group VIII metal selected from Co, Ni, Rh, Pt, Pd, Ir, and mixtures thereof.

16. The process according to claim 15 wherein the nitrogen content of diesel boiling range feedstream is about 50 to about 1000 wppm nitrogen, the sulfur content of the diesel boiling range feedstream ranges from about 50 wppm to about 7000 wppm, and the aromatics content ranges from about 0.05 wt. % to about 2.5 wt. %, all based on the diesel boiling range feedstream.

17. The process according to claim 16 wherein said reaction stage comprises one or more reactors or reaction zones each of which can comprise one or more catalyst beds selected from the group consisting of fluidized beds, ebullating beds, slurry beds, fixed beds, and moving beds wherein each of said one or more catalyst beds contains a catalyst suitable for the reaction zone in which the catalyst bed is located.

18. The process according to claim 17 wherein said reaction stage comprises one or more fixed catalyst beds.

19. The process according to claim 17 wherein said process further comprises cooling between catalyst beds, reactors, or reaction zones in said reaction stage.

20. The process according to claim 15 wherein said diesel boiling range feedstream boils in the range of about 400° F. to about 700° F.

21. The process according to claim 20 wherein said diesel boiling range feedstream is selected from (i) diesel boiling range feedstreams that are not hydrotreated; (ii) are a blend of non-hydrotreated diesel boiling range feedstreams; (iii) are previously hydrotreated diesel boiling range feedstreams; (iv) are blends of hydrotreated diesel boiling range feedstreams; and (v) are blends of non-hydrotreated and hydrotreated diesel boiling range feedstreams.

22. The process according to claim 15 wherein said at least one Group VIII metal is selected from Co, Ni, and mixtures thereof.

23. The process according to claim 15 wherein said bulk metal hydrotreating catalyst is selected from CoMoNb and CoNiMoNb catalysts.

24. The process according to claim 15 wherein said process further comprises:
   b) separating said vapor product from said liquid diesel boiling range product; and
   c) recovering said liquid diesel boiling range product.

25. The process according to claim 15 wherein said liquid diesel boiling range product has a sulfur, nitrogen, and aromatics concentration lower than said diesel boiling range feedstream.

26. The process according to claim 15 wherein said effective hydrotreating conditions comprise temperatures ranging from about 150° C. to about 425° C., weight hourly space velocities range from about 0.1 to about 20 $hr^{-1}$, and pressures ranging from about 4 to about 70 atmospheres.

27. The process according to claim 15 wherein the at least one Group VIII metal and Mo comprise from about 50 wt. % to about 100 wt. %, calculated as oxides, of the total weight of the bulk metal hydrotreating catalyst.

* * * * *